(12) United States Patent
Sibbach et al.

(10) Patent No.: US 12,085,019 B2
(45) Date of Patent: Sep. 10, 2024

(54) OBJECT DIRECTION MECHANISM FOR TURBOFAN ENGINE

(71) Applicant: General Electric Company, Schenectady, NY (US)

(72) Inventors: Arthur William Sibbach, Boxford, MA (US); Brandon Wayne Miller, Liberty Township, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 18/455,137

(22) Filed: Aug. 24, 2023

(65) Prior Publication Data
US 2024/0209777 A1   Jun. 27, 2024

Related U.S. Application Data

(62) Division of application No. 17/408,786, filed on Aug. 23, 2021, now Pat. No. 11,767,790.

(51) Int. Cl.
| | |
|---|---|
| *F02K 3/00* | (2006.01) |
| *F02C 6/20* | (2006.01) |
| *F02C 7/04* | (2006.01) |
| *F02C 7/05* | (2006.01) |

(52) U.S. Cl.
CPC ............ *F02C 7/05* (2013.01); *F02C 6/20* (2013.01); *F02C 7/04* (2013.01); *F02K 3/00* (2013.01); *F05D 2220/36* (2013.01)

(58) Field of Classification Search
CPC ...... F02C 7/05; F02C 7/04; F02C 6/20; F02K 3/00; F05D 2220/36
See application file for complete search history.

(56) References Cited

U.S. PATENT DOCUMENTS

| | | |
|---|---|---|
| 3,533,486 A | 10/1970 | Paulson |
| 3,540,682 A | 11/1970 | Dibble et al. |
| 3,575,259 A | 4/1971 | Wilkinson |
| 3,618,876 A | 11/1971 | Skidmore et al. |
| 3,664,612 A | 5/1972 | Skidmore et al. |
| 3,819,008 A | 6/1974 | Evans et al. |
| 5,010,729 A | 4/1991 | Adamson et al. |
| 6,655,632 B1 | 12/2003 | Gupta et al. |
| 7,055,304 B2 | 6/2006 | Courtot et al. |
| 7,195,456 B2 | 3/2007 | Aggarwala et al. |
| 7,246,773 B2 | 7/2007 | Stoner et al. |
| 7,374,404 B2 | 5/2008 | Schilling |
| 7,789,620 B2 | 9/2010 | Vontell, Sr. et al. |
| 8,186,942 B2 | 5/2012 | Haas |
| 8,529,188 B2 | 9/2013 | Winter |

(Continued)

*Primary Examiner* — David E Sosnowski
*Assistant Examiner* — Theodore C Ribadeneyra
(74) *Attorney, Agent, or Firm* — Dority & Manning, P.A.

(57) ABSTRACT

A turbofan engine is provided. The turbofan engine includes a fan comprising a plurality of fan blades; a turbomachine operably coupled to the fan for driving the fan, the turbomachine comprising a compressor section, a combustion section, and a turbine section in serial flow order and together defining a core air flowpath; a nacelle surrounding and at least partially enclosing the fan; an inlet pre-swirl feature located upstream of the plurality of fan blades, the inlet pre-swirl feature attached to or integrated into the nacelle; and a means for directing incoming objects towards an outer portion of the turbofan engine in communication with the inlet pre-swirl feature.

24 Claims, 9 Drawing Sheets

(56) References Cited

U.S. PATENT DOCUMENTS

| | | |
|---|---|---|
| 8,572,943 B1 | 11/2013 | Sheridan |
| 8,689,538 B2 | 4/2014 | Sankrithi et al. |
| 8,943,796 B2 | 2/2015 | McCaffrey |
| 9,045,991 B2 | 6/2015 | Read et al. |
| 9,540,094 B2 | 1/2017 | Negulescu et al. |
| 9,695,751 B2 | 7/2017 | Kupratis et al. |
| 9,874,109 B2 | 1/2018 | Hatcher, Jr. et al. |
| 9,945,247 B2 | 4/2018 | Appukuttan et al. |
| 10,113,444 B2 | 10/2018 | Huang et al. |
| 10,145,301 B2 | 12/2018 | Abrari et al. |
| 10,184,340 B2 | 1/2019 | Baltas et al. |
| 10,240,526 B2 | 3/2019 | Suciu et al. |
| 10,288,010 B2 | 5/2019 | Houston et al. |
| 10,288,083 B2 | 5/2019 | Miller et al. |
| 10,344,711 B2 | 7/2019 | Hsu |
| 10,378,554 B2 | 8/2019 | Yu et al. |
| 10,399,664 B2 | 9/2019 | Bowden et al. |
| 10,539,025 B2 * | 1/2020 | Kray ................ F01D 9/041 |
| 10,557,415 B2 | 2/2020 | Boudebiza et al. |
| 10,563,513 B2 | 2/2020 | Kalitzin et al. |
| 10,690,146 B2 | 6/2020 | Urac et al. |
| 10,697,471 B2 | 6/2020 | Northall et al. |
| 10,711,797 B2 | 7/2020 | Kroger et al. |
| 10,724,435 B2 | 7/2020 | Kroger et al. |
| 10,794,292 B2 | 10/2020 | Kupratis et al. |
| 10,794,395 B2 | 10/2020 | Tamada |
| 10,794,396 B2 | 10/2020 | Kroger et al. |
| 10,801,442 B2 | 10/2020 | Clements et al. |
| 10,815,886 B2 | 10/2020 | Kroger et al. |
| 10,822,999 B2 | 11/2020 | Morris et al. |
| 10,823,114 B2 | 11/2020 | Clements et al. |
| 10,837,361 B2 | 11/2020 | Abrari et al. |
| 11,047,238 B2 * | 6/2021 | Guegan ................ F01D 5/141 |
| 11,480,063 B1 | 10/2022 | Miller et al. |
| 2001/0023582 A1 | 9/2001 | Nagel |
| 2008/0155989 A1 | 7/2008 | Roth |
| 2009/0155072 A1 | 6/2009 | Winter |
| 2009/0245997 A1 | 10/2009 | Hurwitz et al. |
| 2009/0272850 A1 | 11/2009 | Rainous et al. |
| 2009/0277181 A1 | 11/2009 | Druon et al. |
| 2009/0293445 A1 | 12/2009 | Ress, Jr. |
| 2012/0240594 A1 | 9/2012 | Shamara |
| 2013/0192263 A1 | 8/2013 | Suciu et al. |
| 2013/0319011 A1 | 12/2013 | Pescosolido et al. |
| 2014/0020404 A1 | 1/2014 | Sheridan et al. |
| 2016/0017751 A1 | 1/2016 | Caruel |
| 2016/0084265 A1 | 3/2016 | Yu et al. |
| 2016/0195010 A1 | 7/2016 | Roberge |
| 2016/0298543 A1 | 10/2016 | Suciu et al. |
| 2017/0082028 A1 | 3/2017 | Duong et al. |
| 2017/0114796 A1 | 4/2017 | DiPietro, Jr. et al. |
| 2017/0138202 A1 | 5/2017 | Wadia et al. |
| 2017/0276018 A1 | 9/2017 | Bifulco et al. |
| 2017/0284220 A1 | 10/2017 | Roberge |
| 2017/0297728 A1 | 10/2017 | Niergarth et al. |
| 2018/0073377 A1 | 3/2018 | Hall et al. |
| 2018/0128179 A1 | 5/2018 | Staubach et al. |
| 2018/0138766 A1 | 5/2018 | Moore et al. |
| 2018/0138767 A1 | 5/2018 | Moore et al. |
| 2018/0363554 A1 | 12/2018 | Kroger et al. |
| 2018/0363676 A1 | 12/2018 | Kroger et al. |
| 2018/0363678 A1 | 12/2018 | Kroger et al. |
| 2019/0107119 A1 | 4/2019 | Yu et al. |
| 2019/0170003 A1 * | 6/2019 | Figeureu ................ F04D 29/681 |
| 2019/0226402 A1 | 7/2019 | Kray et al. |
| 2020/0049077 A1 | 2/2020 | Schwarz et al. |
| 2020/0149421 A1 | 5/2020 | Lad |
| 2020/0165938 A1 | 5/2020 | Schreiber et al. |
| 2021/0078715 A1 | 3/2021 | Bevirt et al. |
| 2021/0108597 A1 | 4/2021 | Ostdiek et al. |
| 2023/0028503 A1 | 1/2023 | Sibbach et al. |
| 2023/0053554 A1 | 2/2023 | Sibbach et al. |

* cited by examiner

OBJECT DIRECTION MECHANISM FOR TURBOFAN ENGINE

CROSS-REFERENCE TO RELATED APPLICATIONS

The present application is a continuation of and claims priority to U.S. application Ser. No. 17/408,786 entitled "Object Direction Mechanism for Turbofan Engine", filed Aug. 23, 2021, the entire disclosure of which is hereby expressly incorporated by reference herein.

TECHNICAL FIELD

The present subject matter relates generally to a gas turbine engine, or more particularly to a gas turbine engine configured to direct incoming objects towards an outer portion of the engine and away from a core of the engine.

BACKGROUND

A turbofan engine generally includes a fan having a plurality of fan blades and a turbomachine arranged in flow communication with one another. Additionally, the turbomachine of the turbofan engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

However, during flight, foreign objects in the sky may enter into a core of the engine. The inventors of the present disclosure have found that it may be beneficial to include one or more features to direct these foreign objects towards an outer portion of the engine, away from the inlet of the compressor section.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Figure 1:
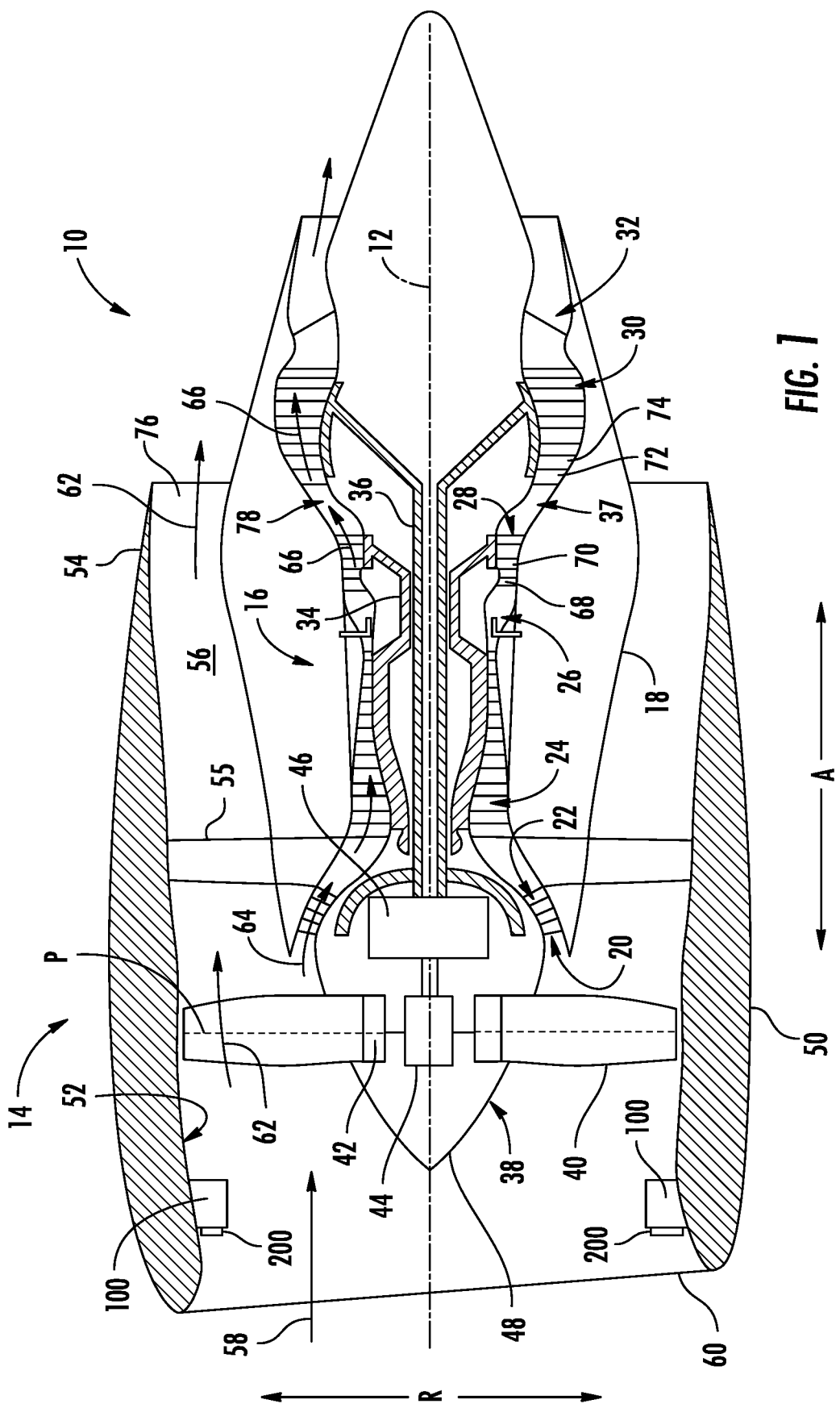
FIG. 1 is a schematic cross-sectional view of an exemplary gas turbine engine according to an exemplary embodiment of the present subject matter.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The following description is provided to enable those skilled in the art to make and use the described embodiments contemplated for carrying out the disclosure. Various modifications, equivalents, variations, and alternatives, however, will remain readily apparent to those skilled in the art. Any and all such modifications, variations, equivalents, and alternatives are intended to fall within the scope of the present disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For purposes of the description hereinafter, the terms "upper", "lower", "right", "left", "vertical", "horizontal", "top", "bottom", "lateral", "longitudinal", and derivatives thereof shall relate to the disclosure as it is oriented in the drawing figures. However, it is to be understood that the disclosure may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine, with forward referring to a position closer to an engine inlet and aft referring to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Additionally, the terms "low," "high," or their respective comparative degrees (e.g., lower, higher, where applicable) each refer to relative speeds or pressures within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section. An engine of the present disclosure may also include an intermediate pressure turbine, e.g., an engine having three spools.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "fan pressure ratio" refers to a ratio of an air pressure immediately downstream of the fan blades if a fan during operation of the fan to an air pressure immediately upstream of the fan blades of the fan during operation of the fan.

As used herein, the term "rated speed" with reference to a turbofan engine refers to a maximum rotational speed that the turbofan engine may achieve while operating properly. For example, the turbofan engine may be operating at the rated speed during maximum load operations, such as during takeoff operations.

Also as used herein, the term "fan tip speed" as defined by the plurality of fan blades of the fan refers to a linear speed of an outer tip of a fan blade along a radial direction during operation of the fan.

The present disclosure is generally related to a means for directing incoming objects towards an outer portion of a turbofan engine in communication with and/or on an inlet pre-swirl feature, e.g., configured as a plurality of part span inlet guide vanes. The means for directing incoming objects towards the outer portion of the turbofan engine directs incoming objects away from a core air flowpath of the engine and towards a bypass airflow passage. This provides a deflection mechanism that facilitates ingestion of an object into an outer portion of the engine by minimizing the chance that the object travels to the core of the engine.

In some exemplary embodiments of the present disclosure, the means for directing incoming objects towards an outer portion of the turbofan engine includes a shroud in communication with a portion of the inlet pre-swirl feature, e.g., configured as a plurality of part span inlet guide vanes.

In other exemplary embodiments of the present disclosure, the means for directing incoming objects towards an outer portion of the turbofan engine includes a leading edge of the inlet pre-swirl feature, e.g., configured as a plurality of part span inlet guide vanes, having a forward sweep angle.

In other exemplary embodiments of the present disclosure, the means for directing incoming objects towards an outer portion of the turbofan engine includes a leading edge of the inlet pre-swirl feature, e.g., configured as a plurality of part span inlet guide vanes, that is serrated.

In other exemplary embodiments of the present disclosure, the means for directing incoming objects towards an outer portion of the turbofan engine includes an inlet pre-swirl feature, e.g., configured as a plurality of part span inlet guide vanes, having a leading edge formed of a metallic material. For example, the inlet pre-swirl feature, e.g., configured as a plurality of part span inlet guide vanes, can be made of many different materials, including polymer composites made of carbon fiber & resin, or fabricated from metal, including aluminum or stainless steel alloys. A composite or aluminum pre-swirl feature may incorporate a metallic leading edge made of titanium or stainless steel specifically to provide stiffness and address the issue of bird ingestion. Incorporating additional stiffness into the pre-swirl feature design via internal trusses or other structures should be well known to one that is skilled in the art, and can be accomplished by many different structural methods, depending on the chosen material and blade shape.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is an aeronautical, turbofan jet engine 10, referred to herein as "turbofan engine 10", configured to be mounted to an aircraft, such as in an under-wing configuration or tail-mounted configuration. As shown in FIG. 1, the turbofan engine 10 defines an axial direction A (extending parallel to a longitudinal centerline 12 provided for reference), a radial direction R, and a circumferential direction (i.e., a direction extending about the axial direction A; not depicted). In general, the turbofan engine 10 includes a fan section 14 and a turbomachine 16 disposed downstream from the fan section 14 (the turbomachine 16 sometimes also, or alternatively, referred to as a "core turbine engine").

The exemplary turbomachine 16 depicted generally includes a substantially tubular outer casing 18 that defines an annular inlet 20. The outer casing 18 encases, in serial flow relationship, a compressor section including a first, booster or low pressure (LP) compressor 22 and a second, high pressure (HP) compressor 24; a combustion section 26; a turbine section including a first, high pressure (HP) turbine 28 and a second, low pressure (LP) turbine 30; and a jet exhaust nozzle section 32. A high pressure (HP) shaft 34 drivingly connects the HP turbine 28 to the HP compressor 24. A low pressure (LP) shaft 36 drivingly connects the LP turbine 30 to the LP compressor 22. The compressor section, combustion section 26, turbine section, and jet exhaust nozzle section 32 are arranged in serial flow order and together define a core air flowpath 37 through the turbomachine 16. It is also contemplated that the present disclosure is compatible with an engine having an intermediate pressure turbine, e.g., an engine having three spools.

Referring still the embodiment of FIG. 1, the fan section 14 includes a variable pitch, single stage fan 38, the turbomachine 16 operably coupled to the fan 38 for driving the fan 38. The fan 38 includes a plurality of rotatable fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40, e.g., in unison. The fan blades 40, disk 42, and actuation member 44 are together rotatable about the longitudinal centerline 12 by LP shaft 36 across a power gear box 46. The power gear box 46 includes a plurality of gears for stepping down the rotational speed of the LP shaft 36 to a more efficient rotational fan speed. Accordingly, for the embodiment depicted, the turbomachine 16 is operably coupled to the fan 38 through the power gear box 46.

In exemplary embodiments, the fan section 14 includes twenty-two (22) or fewer fan blades 40. In certain exemplary embodiments, the fan section 14 includes twenty (20) or fewer fan blades 40. In certain exemplary embodiments, the fan section 14 includes eighteen (18) or fewer fan blades 40. In certain exemplary embodiments, the fan section 14 includes sixteen (16) or fewer fan blades 40. In certain exemplary embodiments, it is contemplated that the fan section 14 includes other number of fan blades 40 for a particular application.

During operation of the turbofan engine 10, the fan 38 defines a fan pressure ratio and the plurality of fan blades 40 each define a fan tip speed. The exemplary turbofan engine 10 depicted defines a relatively high fan tip speed and relatively low fan pressure ratio during operation of the turbofan engine at a rated speed. As used herein, the term "fan pressure ratio" refers to a ratio of an air pressure immediately downstream of the fan blades 40 during operation of the fan 38 to an air pressure immediately upstream of the fan blades 40 during operation of the fan 38. For the embodiment depicted in FIG. 1, the fan 38 of the turbofan engine 10 defines a relatively low fan pressure ratio. For example, the turbofan engine 10 depicted defines a fan pressure ratio less than or equal to about 1.5. For example, in certain exemplary embodiments, the turbofan engine 10 may define a fan pressure ratio less than or equal to about 1.4. The fan pressure ratio may be the fan pressure ratio of the fan 38 during operation of the turbofan engine 10, such as during operation of the turbofan engine 10 at a rated speed.

As used herein, the term "rated speed" with reference to the turbofan engine 10 refers to a maximum rotational speed that the turbofan engine 10 may achieve while operating properly. For example, the turbofan engine 10 may be operating at the rated speed during maximum load operations, such as during takeoff operations.

Also as used herein, the term "fan tip speed" defined by the plurality of fan blades 40 refers to a linear speed of an outer tip of a fan blade 40 along the radial direction R during operation of the fan 38. In exemplary embodiments, the turbofan engine 10 of the present disclosure causes the fan blades 40 of the fan 38 to rotate at a relatively high rotational speed. For example, during operation of the turbofan engine 10 at the rated speed, the fan tip speed of each of the plurality of fan blades 40 is greater than or equal to 1000 feet per second and less than or equal to 2250 feet per second. In certain exemplary embodiments, during operation of the turbofan engine 10 at the rated speed, the fan tip speed of each of the fan blades 40 may be greater than or equal to 1,250 feet per second and less than or equal to 2250 feet per second. In certain exemplary embodiments, during operation of the turbofan engine 10 at the rated speed, the fan tip speed of each of the fan blades 40 may be greater than or equal to about 1,350 feet per second, such as greater than about 1,450 feet per second, such as greater than about 1,550 feet per second, and less than or equal to 2250 feet per second.

Referring still to the exemplary embodiment of FIG. 1, the disk 42 is covered by rotatable front nacelle or hub 48 aerodynamically contoured to promote an airflow through the plurality of fan blades 40. Additionally, the exemplary fan section 14 includes an annular fan casing or outer nacelle 50 that at least partially, and for the embodiment depicted, circumferentially, surrounds the fan 38 and at least a portion of the turbomachine 16.

More specifically, the outer nacelle 50 includes an inner wall 52 and a downstream section 54 of the inner wall 52 of the outer nacelle 50 extends over an outer portion of the turbomachine 16 so as to define a bypass airflow passage 56 therebetween. Additionally, for the embodiment depicted, the outer nacelle 50 is supported relative to the turbomachine 16 by a plurality of circumferentially spaced outlet guide vanes 55.

During operation of the turbofan engine 10, a volume of air 58 enters the turbofan engine 10 through an associated inlet 60 of the outer nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37. The ratio between an amount of airflow through the bypass airflow passage 56 (i.e., the first portion of air indicated by arrows 62) to an amount of airflow through the core air flowpath 37 (i.e., the second portion of air indicated by arrows 64) is known as a bypass ratio.

In exemplary embodiments, the bypass ratio during operation of the turbofan engine 10 (e.g., at a rated speed) is less than or equal to about eleven (11). For example, the bypass ratio during operation of the turbofan engine 10 (e.g., at a rated speed) may be less than or equal to about ten (10), such as less than or equal to about nine (9). Additionally, the bypass ratio may be at least about two (2).

In other exemplary embodiments, the bypass ratio may generally be between about 7:1 and about 20:1, such as between about 10:1 and about 18:1. The pressure of the second portion of air 64 is then increased as it is routed through the high pressure (HP) compressor 24 and into the combustion section 26, where it is mixed with fuel and burned to provide combustion gases 66.

In exemplary embodiments, a gear ratio of the power gear box 46 is greater than or equal to 1.2 and less than or equal to 3.0. In some exemplary embodiments, the gear ratio of the power gear box 46 is greater than or equal to 1.2 and less than or equal to 2.6. In other exemplary embodiments, the gear ratio of the power gear box 46 is greater than or equal to 1.2 and less than or equal to 2.0.

Furthermore, the turbofan engine of the present disclosure also provides pre-swirling flow forward of the fan blade tip as described herein.

Referring still to FIG. 1, the compressed second portion of air 64 from the compressor section mixes with fuel and is burned within the combustion section to provide combustion gases 66. The combustion gases 66 are routed from the combustion section 26, through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft 34, thus causing the HP shaft 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the turbomachine 16.

Referring still to FIG. 1, the turbofan engine 10 additionally includes a means for directing incoming objects towards an outer portion of the turbofan engine 200 in communication and/or on the inlet pre-swirl feature, e.g., configured as a plurality of part span inlet guide vanes 100, as described in greater detail herein. As described herein, the means for directing incoming objects towards an outer portion of the turbofan engine 200 directs incoming objects away from the core air flowpath 37 and towards the bypass airflow passage 56.

In some exemplary embodiments, it will be appreciated that the exemplary turbofan engine 10 of the present disclosure may be a relatively large power class turbofan engine 10. Accordingly, when operated at the rated speed, the turbofan engine 10 may be configured to generate a relatively large amount of thrust. More specifically, when operated at the rated speed, the turbofan engine 10 may be configured to generate at least about 20,000 pounds of thrust, such as at least about 25,000 pounds of thrust, such as at least about 30,000 pounds of thrust, and up to, e.g., about 150,000 pounds of thrust. Accordingly, the turbofan engine 10 may be referred to as a relatively large power class gas turbine engine.

Moreover, it should be appreciated that the exemplary turbofan engine 10 depicted in FIG. 1 is by way of example only, and that in other exemplary embodiments, the turbofan engine 10 may have any other suitable configuration. For example, in certain exemplary embodiments, the fan may not be a variable pitch fan, the engine may not include a reduction gearbox (e.g., power gearbox 46) driving the fan, may include any other suitable number or arrangement of shafts, spools, compressors, turbines, etc.

Figure 2:
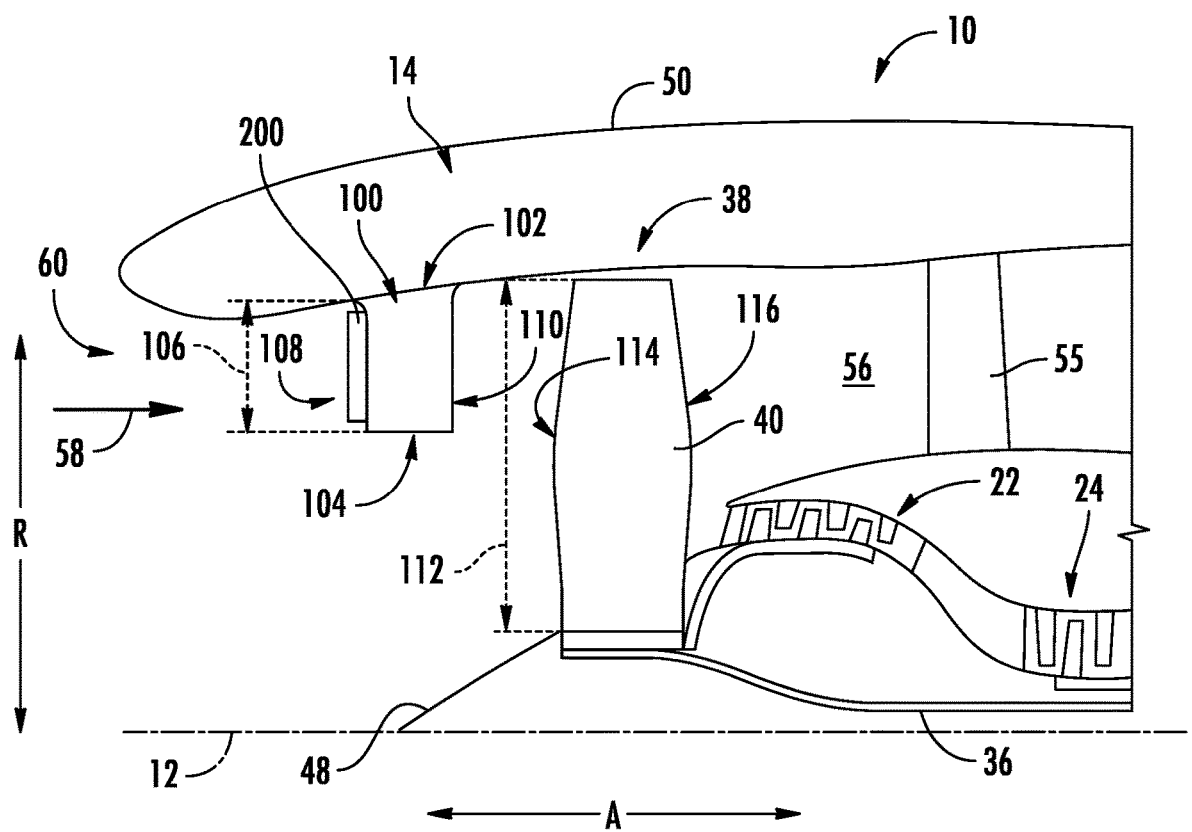
FIG. 2 is a close-up, schematic, cross-sectional view of a forward end of the exemplary gas turbine engine of FIG. 1 according to an exemplary embodiment of the present subject matter.

As discussed above, the turbofan engine 10 of the present disclosure also provides pre-swirling flow forward of the fan blade tip. Referring now also to FIG. 2, a close-up, cross-sectional view of the fan section 14 and forward end of the turbomachine 16 of the exemplary turbofan engine 10 of FIG. 1 is provided. In exemplary embodiments, the turbofan engine 10 includes an inlet pre-swirl feature located upstream of the plurality of fan blades 40 of the fan 38 and attached to or integrated into the outer nacelle 50. More specifically, for the embodiment of FIGS. 1 and 2, the inlet pre-swirl feature is configured as a plurality of part span inlet guide vanes 100. The plurality of part span inlet guide vanes 100 are each cantilevered from of the outer nacelle 50 (such as from the inner wall 52 of the outer nacelle 50) at a location forward of the plurality of fan blades 40 of the fan 38 along the axial direction A and aft of the inlet 60 of the outer nacelle 50. More specifically, each of the plurality of part span inlet guide vanes 100 define an outer end 102 along the radial direction R, and are attached to/connected to the outer nacelle 50 at the radially outer end 102 through a suitable connection means (not shown). For example, each of the plurality of part span inlet guide vanes 100 may be bolted to the inner wall 52 of the outer nacelle 50 at the outer end 102, welded to the inner wall 52 of the outer nacelle 50 at the outer end 102, or attached to the outer nacelle 50 in any other suitable manner at the outer end 102.

Further, for the embodiment depicted, the plurality of part span inlet guide vanes 100 extend generally along the radial direction R from the outer end 102 to an inner end 104 (i.e., an inner end 104 along the radial direction R). Moreover, as will be appreciated, for the embodiment depicted, each of the plurality of part span inlet guide vanes 100 are unconnected with an adjacent part span inlet guide vane 100 at the respective inner ends 104 (i.e., adjacent part span inlet guide vanes 100 do not contact one another at the radially inner ends 104, and do not include any intermediate connection members at the radially inner ends 104, such as a connection ring, strut, etc.). More specifically, for the embodiment depicted, each part span inlet guide vane 100 is completely supported by a connection to the outer nacelle 50 at the respective outer end 102 (and not through any structure extending, e.g., between adjacent part span inlet guide vanes 100 at a location inward of the outer end 102 along the radial direction R). As will be discussed below, such may reduce an amount of turbulence generated by the part span inlet guide vanes 100.

Moreover, is depicted, each of the plurality of part span inlet guide vanes 100 do not extend completely between the outer nacelle 50 and, e.g., the hub 48 of the turbofan engine 10. More specifically, for the embodiment depicted, each of the plurality of inlet guide vane define an inlet guide vane ("IGV") span 106 along the radial direction R, and further each of the plurality of part span inlet guide vanes 100 further define a leading edge 108 and a trailing edge 110. The IGV span 106 refers to a measure along the radial direction R between the outer end 102 and the inner end 104 of the part span inlet guide vane 100 at the leading edge 108 of the part span inlet guide vane 100. Similarly, it will be appreciated, that the plurality of fan blades 40 of the fan 38 define a fan blade span 112 along the radial direction R. More specifically, each of the plurality of fan blades 40 of the fan 38 also defines a leading edge 114 and a trailing edge 116, and the IGV span 106 refers to a measure along the radial direction R between a radially outer tip and a base of the fan blade 40 at the leading edge 114 of the respective fan blade 40.

For the embodiment depicted, the IGV span 106 is at least about five percent of the fan blade span 112 and up to about fifty-five percent of the fan blade span 112. For example, in certain exemplary embodiments, the IGV span 106 may be between about fifteen percent of the fan blade span 112 and about forty-five percent of the fan blade span 112, such as between about thirty percent of the fan blade span 112 and about forty percent of the fan blade span 112.

Figure 3:
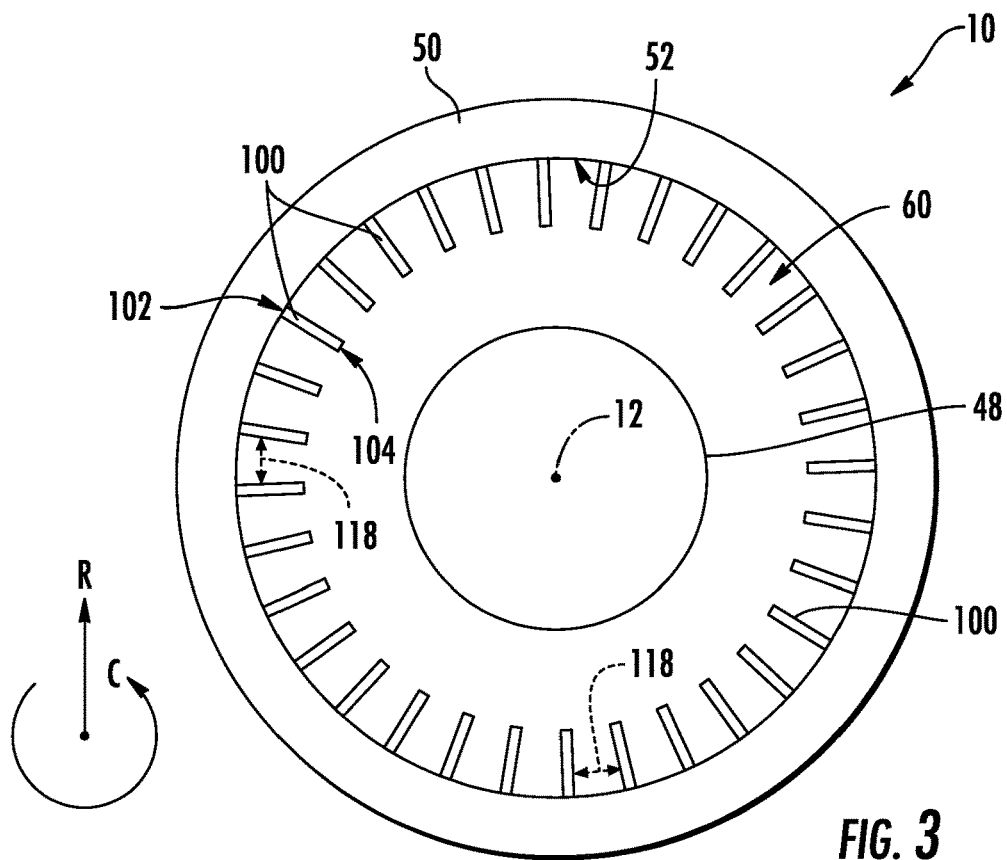
FIG. 3 is a schematic view of an inlet to the exemplary gas turbine engine of FIG. 1, along an axial direction of the gas turbine engine of FIG. 1 according to an exemplary embodiment of the present subject matter.

Reference will now also be made to FIG. 3, providing an axial view of the inlet 60 to the turbofan engine 10 of FIGS. 1 and 2. As will be appreciated, for the embodiment depicted, the plurality of part span inlet guide vanes 100 of the turbofan engine 10 includes a relatively large number of part span inlet guide vanes 100. More specifically, for the embodiment depicted, the plurality of part span inlet guide vanes 100 includes between about ten part span inlet guide vanes 100 and about fifty part span inlet guide vanes 100. More specifically, for the embodiment depicted, the plurality of part span inlet guide vanes 100 includes between about twenty part span inlet guide vanes 100 and about forty-five part span inlet guide vanes 100, and more specifically, still, the embodiment depicted includes thirty-two part span inlet guide vanes 100. Additionally, for the embodiment depicted, each of the plurality of part span inlet guide vanes 100 are spaced substantially evenly along the circumferential direction C. More specifically, each of the plurality of part span inlet guide vanes 100 defines a circumferential spacing 118 with an adjacent part span inlet guide vane 100, with the circumferential spacing 118 being substantially equal between each adjacent part span inlet guide vane 100.

Although not depicted, in certain exemplary embodiments, the number of part span inlet guide vanes 100 may be substantially equal to the number of fan blades 40 of the fan 38 of the turbofan engine 10. In other embodiments, however, the number of part span inlet guide vanes 100 may be greater than the number of fan blades 40 of the fan 38 of the turbofan engine 10, or alternatively, may be less than the number of fan blades 40 of the fan 38 of the turbofan engine 10.

Figure 4:
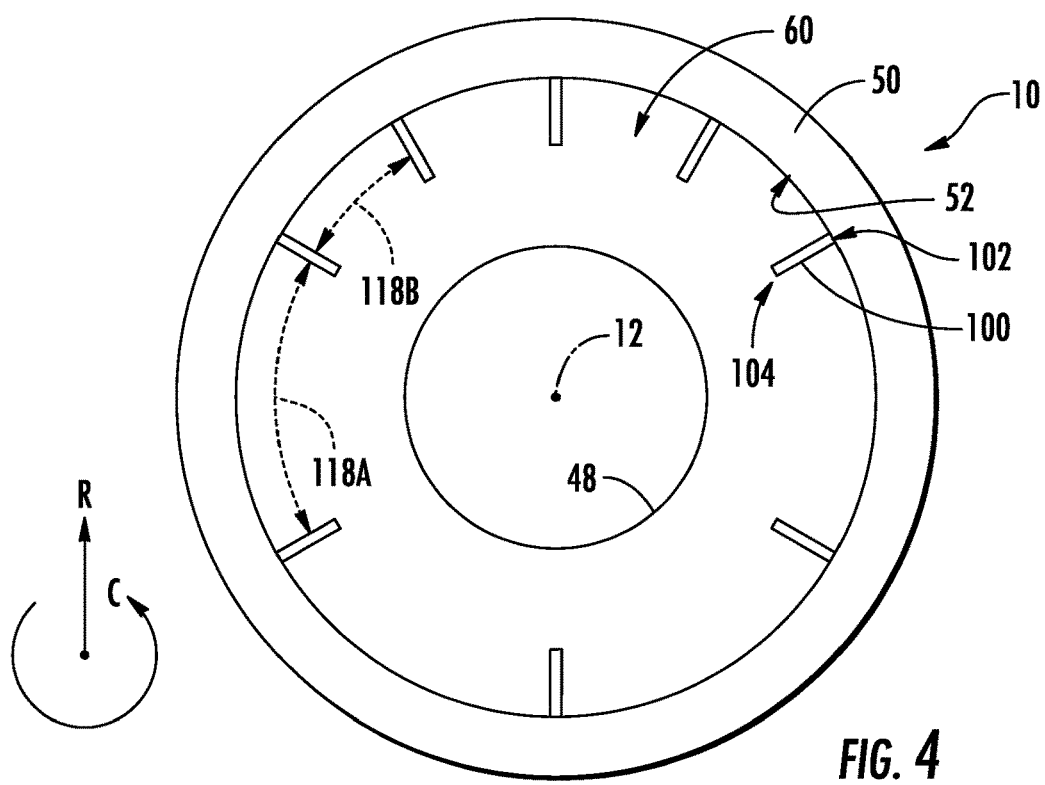
FIG. 4 it is a schematic view of an inlet to a gas turbine engine in accordance with another exemplary embodiment of the present disclosure.

Further, it should be appreciated, that in other exemplary embodiments, the turbofan engine 10 may include any other suitable number of part span inlet guide vanes 100 and/or circumferential spacing 118 of the part span inlet guide vanes 100. For example, referring now briefly to FIG. 4, an axial view of an inlet 60 to a turbofan engine 10 in accordance with another exemplary embodiment of the present disclosure is provided. For the embodiment of FIG. 4, the turbofan engine 10 includes less than twenty part span inlet guide vanes 100. More specifically, for the embodiment of FIG. 4, the turbofan engine 10 includes at least eight part span inlet guide vanes 100, or more specifically includes exactly eight part span inlet guide vanes 100. Additionally, for the embodiment of FIG. 4, the plurality of part span inlet guide vanes 100 are not substantially evenly spaced along the circumferential direction C. For example, at least certain of the plurality of part span inlet guide vanes 100 define a first circumferential spacing 118A, while other of the plurality of part span inlet guide vanes 100 define a second circumferential spacing 118B. For the embodiment depicted, the first circumferential spacing 118A is at least about twenty percent greater than the second circumferential spacing 118B, such as at least about twenty-five percent greater such as at least about thirty percent greater, such as up to about two hundred percent greater. Notably, as will be described in greater detail below, the circumferential spacing 118 refers to a mean circumferential spacing between adjacent part span inlet guide vanes 100. The non-uniform circumferential spacing may, e.g., offset structure upstream of the part span inlet guide vanes 100.

Referring back to FIG. 2, it will be appreciated that each of the plurality of part span inlet guide vanes 100 is configured to pre-swirl an airflow 58 provided through the inlet 60 of the outer nacelle 50, upstream of the plurality of fan blades 40 of the fan 38. As briefly discussed above, pre-swirling the airflow 58 provided through the inlet 60 of the outer nacelle 50 prior to such airflow 58 reaching the plurality of fan blades 40 of the fan 38 may reduce separation losses and/or shock losses, allowing the fan 38 to operate with the relatively high fan tip speeds described above with less losses in efficiency.

As discussed, the present disclosure provides a means for directing incoming objects towards an outer portion of the turbofan engine 200 in communication and/or on the inlet pre-swirl feature, e.g., configured as a plurality of part span inlet guide vanes 100, as described in greater detail herein. As described herein, the means for directing incoming objects towards an outer portion of the turbofan engine 200 directs incoming objects away from the core air flowpath 37 and towards the bypass airflow passage 56. This provides a deflection mechanism that facilitates ingestion of an object into an outer portion of the turbofan engine 10 by minimizing the chance that the object travels to the core of the turbofan engine 10.

Figure 5:
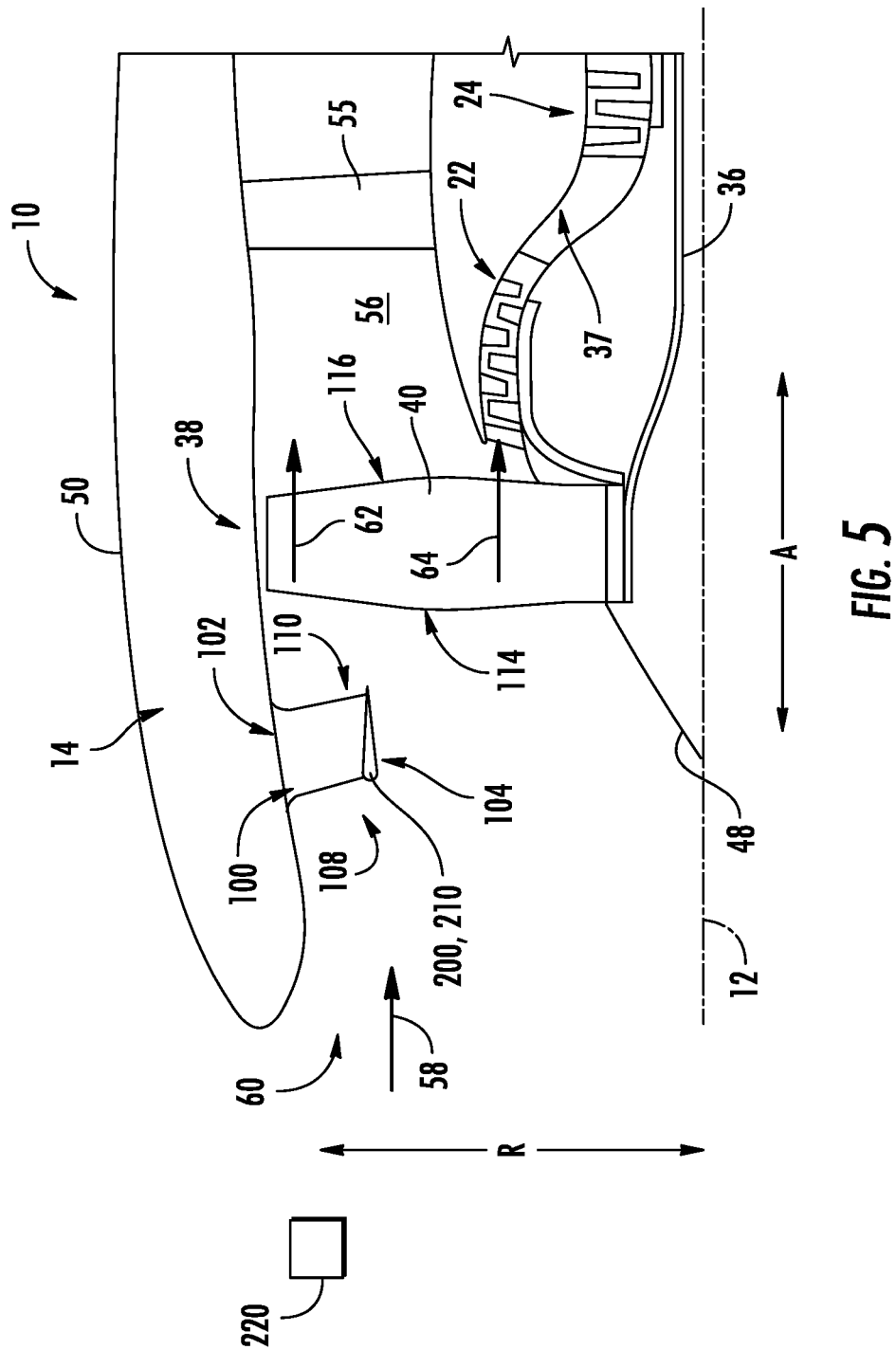
FIG. 5 is a schematic cross-sectional view of an exemplary gas turbine engine according to an exemplary embodiment of the present subject matter.
Figure 6:
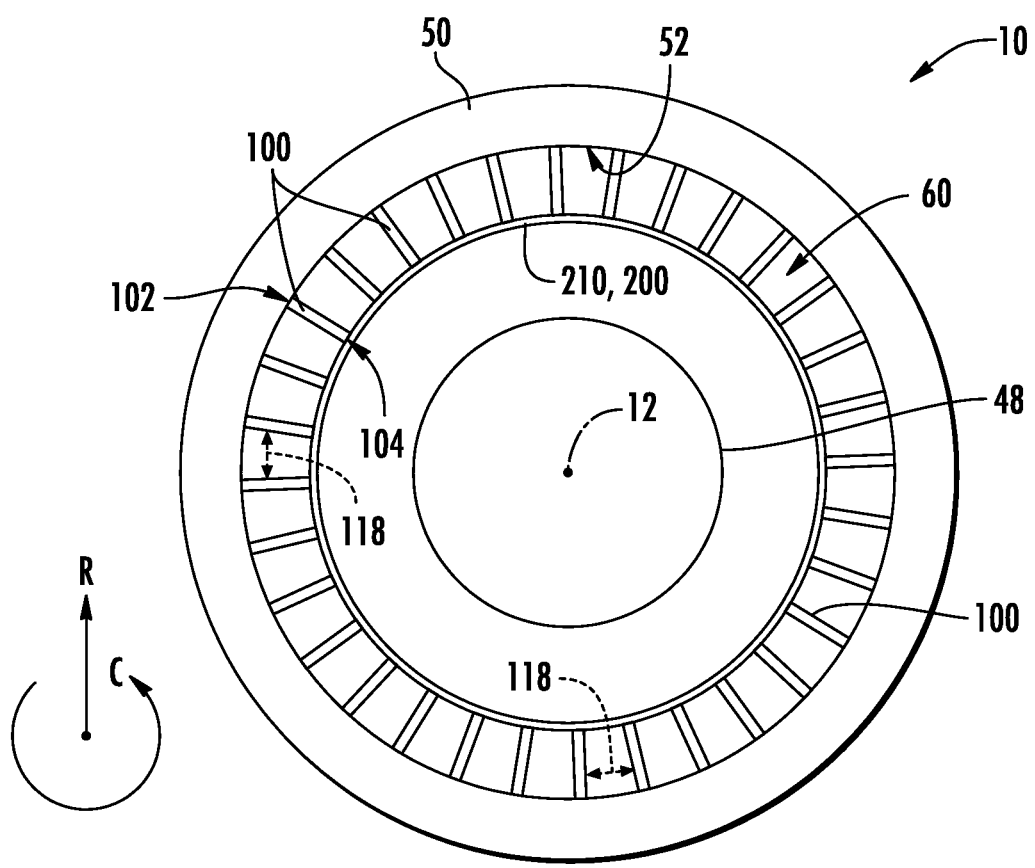
FIG. 6 is a close-up, schematic, cross-sectional view of a forward end of the exemplary gas turbine engine of FIG. 1 according to another exemplary embodiment of the present subject matter.
Figure 7:
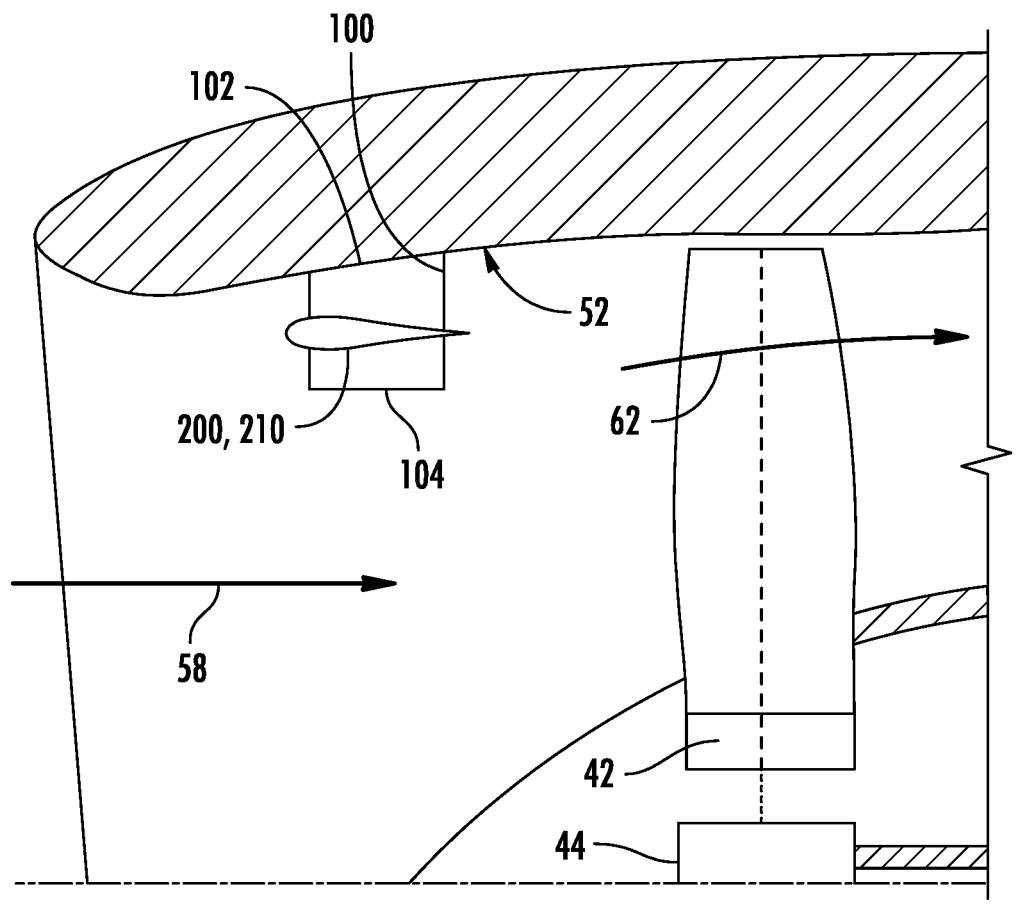
FIG. 7 is a schematic cross-sectional view of an exemplary gas turbine engine according to another exemplary embodiment of the present subject matter.

Referring now generally to FIGS. 5 through 7, in exemplary embodiments of the present disclosure, the means for directing incoming objects towards an outer portion of the turbofan engine 200 includes a shroud 210 in communication with a portion of the inlet pre-swirl feature, e.g., configured as a plurality of part span inlet guide vanes 100.

The shroud 210 is configured to separate an engine inlet airflow, e.g., the volume of air 58, into an inner airflow portion, e.g., a second portion of the air indicated by arrows 64 that is directed or routed into the core air flowpath 37, and an outer airflow portion, e.g., a first portion of the air indicated by arrows 62 that is directed or routed into the bypass airflow passage 56, relative to the radial direction R.

In this manner, the means for directing incoming objects towards an outer portion of the turbofan engine 200 directs an incoming object 220 away from the core air flowpath 37 and towards the bypass airflow passage 56. The shroud 210 minimizes the potential for an incoming object 220 that may strike an inlet guide vane 100 from being deflected toward the core air flowpath 37.

Referring to FIG. 5, a close-up, cross-sectional view of a fan section 14 and a forward end of a turbomachine 16 of a turbofan engine 10 in accordance with an exemplary embodiment of the present disclosure is provided. The exemplary turbofan engine 10 of FIG. 5 may be configured in a similar manner as the exemplary engine of FIG. 2 described above. In the exemplary embodiment depicted, the shroud 210 is located at the inner end 104 of the inlet pre-swirl feature, e.g., configured as a plurality of part span inlet guide vanes 100. Reference will now also be made to FIG. 6, providing an axial view of the inlet 60 to the turbofan engine 10 of FIGS. 1 and 2, which illustrates the shroud 210 extending circumferentially at the inner end 104 of each of the part span inlet guide vanes 100.

Referring to FIG. 7, a close-up, cross-sectional view of a fan section 14 and a forward end of a turbomachine 16 of a turbofan engine 10 in accordance with an exemplary embodiment of the present disclosure is provided. The exemplary turbofan engine 10 of FIG. 7 may be configured in a similar manner as the exemplary engine of FIG. 2 described above. In the exemplary embodiment depicted, the shroud 210 is located at a portion of the inlet pre-swirl feature, e.g., configured as a plurality of part span inlet guide vanes 100, between the inner end 104 and the outer end 102. For example, in an exemplary embodiment, the shroud 210 is located at a portion of the inlet pre-swirl feature, e.g., configured as a plurality of part span inlet guide vanes 100, that is closer to the inner end 104 than the outer end 102.

In other exemplary embodiments, it is contemplated that the shroud 210 may be located anywhere along the inlet pre-swirl feature, e.g., configured as a plurality of part span inlet guide vanes 100, such that it remains within the radially innermost 50% of the inlet guide vane 100, e.g., at any portion that is closer to the inner end 104 than the outer end 102. It is also contemplated that the shroud 210 may be located at a midpoint between the inner end 104 and the outer end 102.

Figure 8:
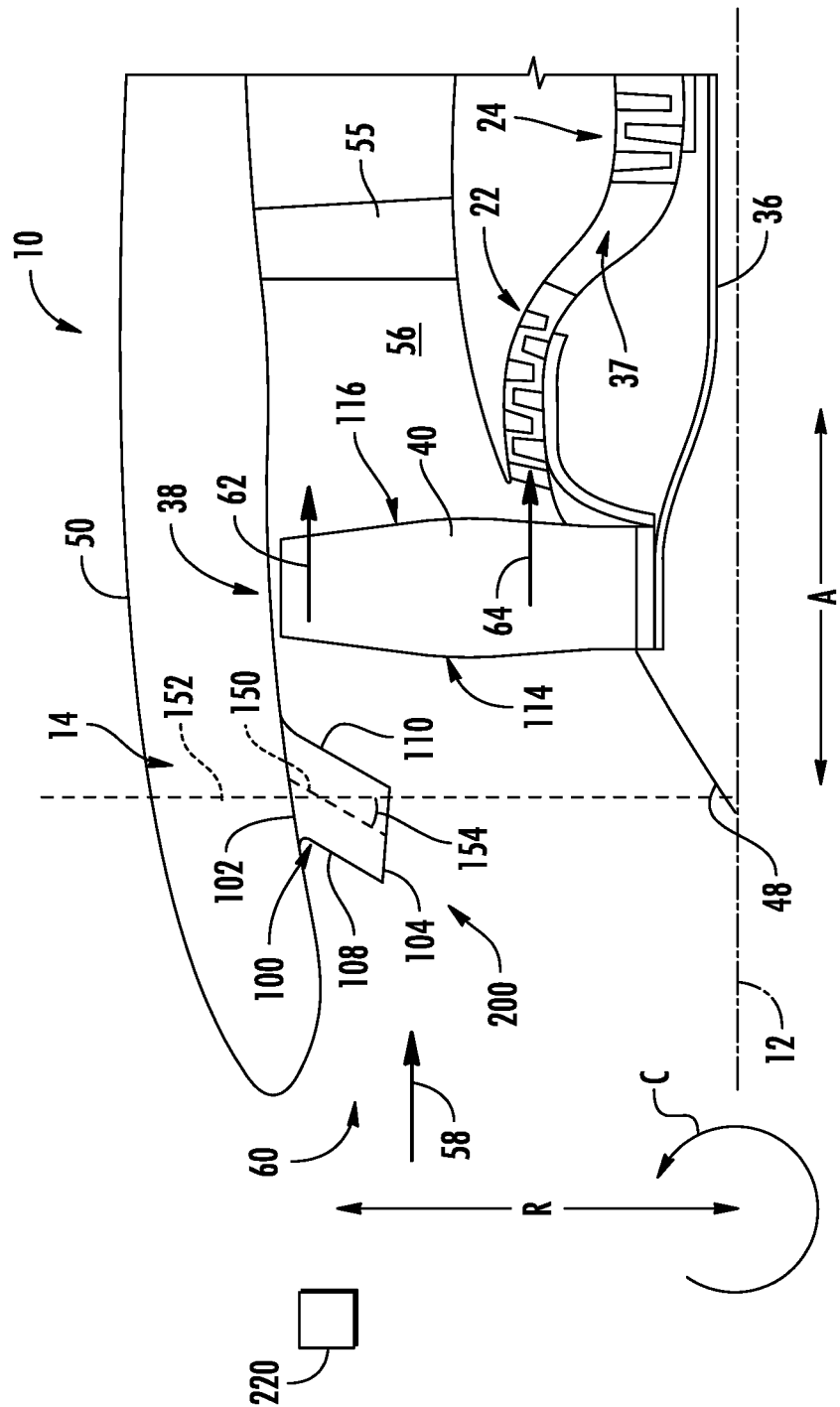
FIG. 8 is a schematic cross-sectional view of an exemplary gas turbine engine according to another exemplary embodiment of the present subject matter.

Referring now to FIG. 8, a close-up, cross-sectional view of a fan section 14 and a forward end of a turbomachine 16 of a turbofan engine 10 in accordance with an exemplary embodiment of the present disclosure is provided. The exemplary turbofan engine 10 of FIG. 8 may be configured in a similar manner as the exemplary engine of FIG. 2 described above. In an exemplary embodiment, the means for directing incoming objects towards an outer portion of the turbofan engine 200 includes a leading edge 108 of the inlet pre-swirl feature, e.g., configured as a plurality of part span inlet guide vanes 100, having a forward sweep angle 154.

For the exemplary embodiment depicted in FIG. 8, the exemplary part span inlet guide vanes 100 are configured as "forward swept" part span inlet guide vanes. More specifically, as is depicted, the exemplary part span inlet guide vanes 100 each define a longitudinal axis 150 extending halfway between the leading edge 108 and a trailing edge 110 from the radially inner end 104 to the radially outer end 102. Additionally, the exemplary turbofan engine 10 defines a reference plane 152, or more specifically, the radial direction R and circumferential direction C the turbofan engine 10 together define a reference plane 152. The longitudinal axis 150 of each of the plurality of part span inlet guide vanes 100 intersects the reference plane 152 and defines a forward sweep angle 154 with the reference plane 152.

In an exemplary embodiment, the forward sweep angle 154 with the reference plane 152 is greater than about three degrees and up to about sixty-five degrees. In another exemplary embodiment, the forward sweep angle 154 with the reference plane 152 is between about three degrees and about forty-five degrees. In yet another exemplary embodiment, the forward sweep angle 154 with the reference plane 152 is between about three degrees and about thirty degrees.

In this manner, a leading edge 108 of the inlet pre-swirl feature, e.g., configured as a plurality of part span inlet guide vanes 100, having a forward sweep angle 154 directs incoming objects 220 away from the core air flowpath 37 and towards the bypass airflow passage 56. This provides a deflection mechanism that facilitates ingestion of an object into an outer portion of the turbofan engine 10 by minimizing the chance that the object travels to the core of the turbofan engine 10.

Figure 9:
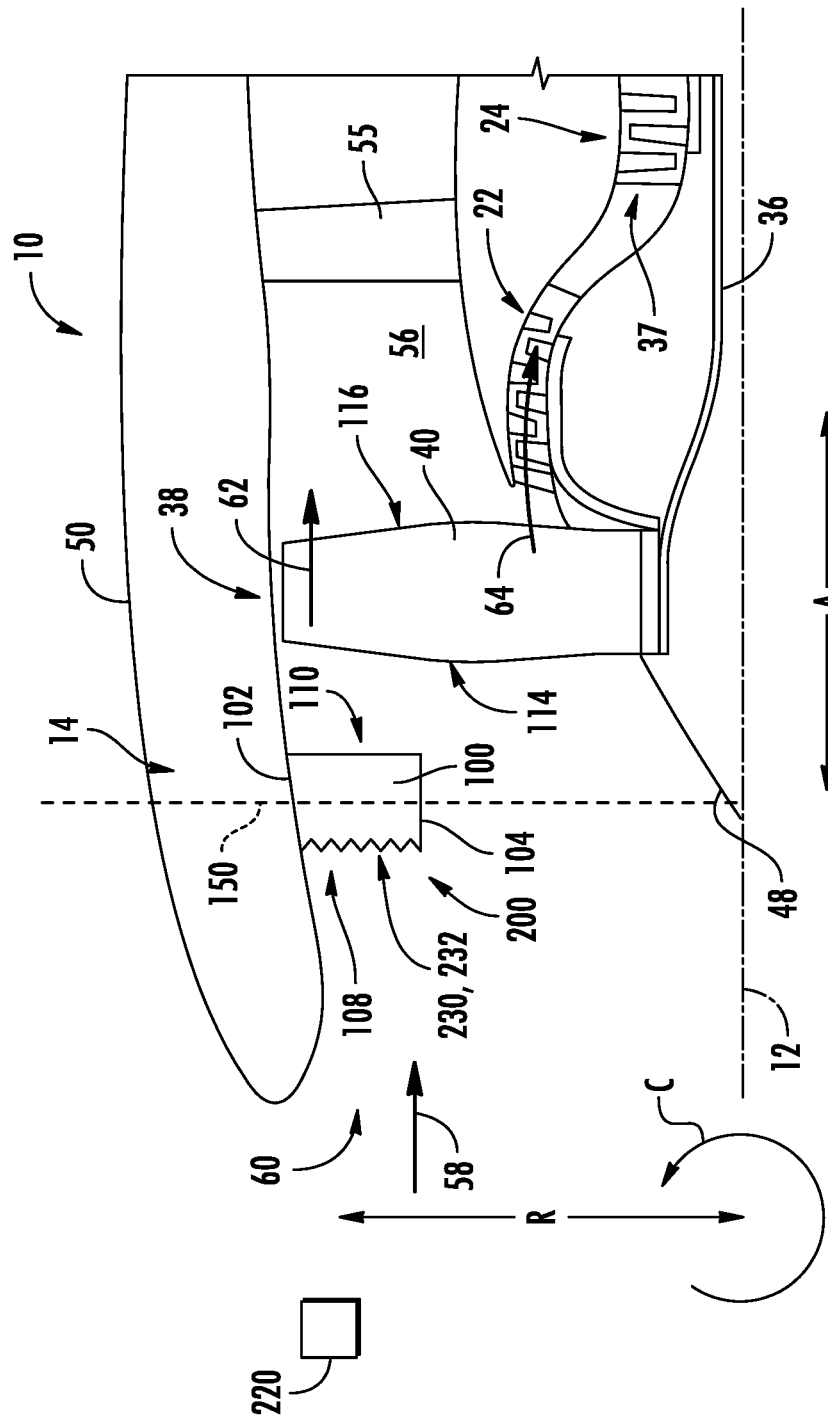
FIG. 9 is a schematic cross-sectional view of an exemplary gas turbine engine according to another exemplary embodiment of the present subject matter.

Referring now to FIG. 9, a close-up, cross-sectional view of a fan section 14 and a forward end of a turbomachine 16 of a turbofan engine 10 in accordance with an exemplary embodiment of the present disclosure is provided. The exemplary turbofan engine 10 of FIG. 9 may be configured in a similar manner as the exemplary engine of FIG. 2 described above. In an exemplary embodiment, the means for directing incoming objects towards an outer portion of the turbofan engine 200 includes a leading edge 108 of the inlet pre-swirl feature, e.g., configured as a plurality of part span inlet guide vanes 100, that is serrated. For example, the leading edge 108 includes a serrated portion 230. As used herein, the term "serrated", with reference to a leading edge 108, refers to any shape or configuration that is able to slice any incoming objects 220.

In this manner, a leading edge 108 of the inlet pre-swirl feature, e.g., configured as a plurality of part span inlet guide vanes 100, having the serrated portion 230 slices and/or cuts any incoming objects 220 and directs incoming objects 220 away from the core air flowpath 37 and towards the bypass airflow passage 56. This provides a deflection mechanism that facilitates ingestion of an object into an outer portion of the turbofan engine 10 by minimizing the chance that the object travels to the core of the turbofan engine 10.

Referring to FIG. 9, in an exemplary embodiment, the means for directing incoming objects towards an outer portion of the turbofan engine 200 includes a leading edge 108 of the inlet pre-swirl feature, e.g., configured as a plurality of part span inlet guide vanes 100, that includes saw-toothed serrations 232.

Figure 10:
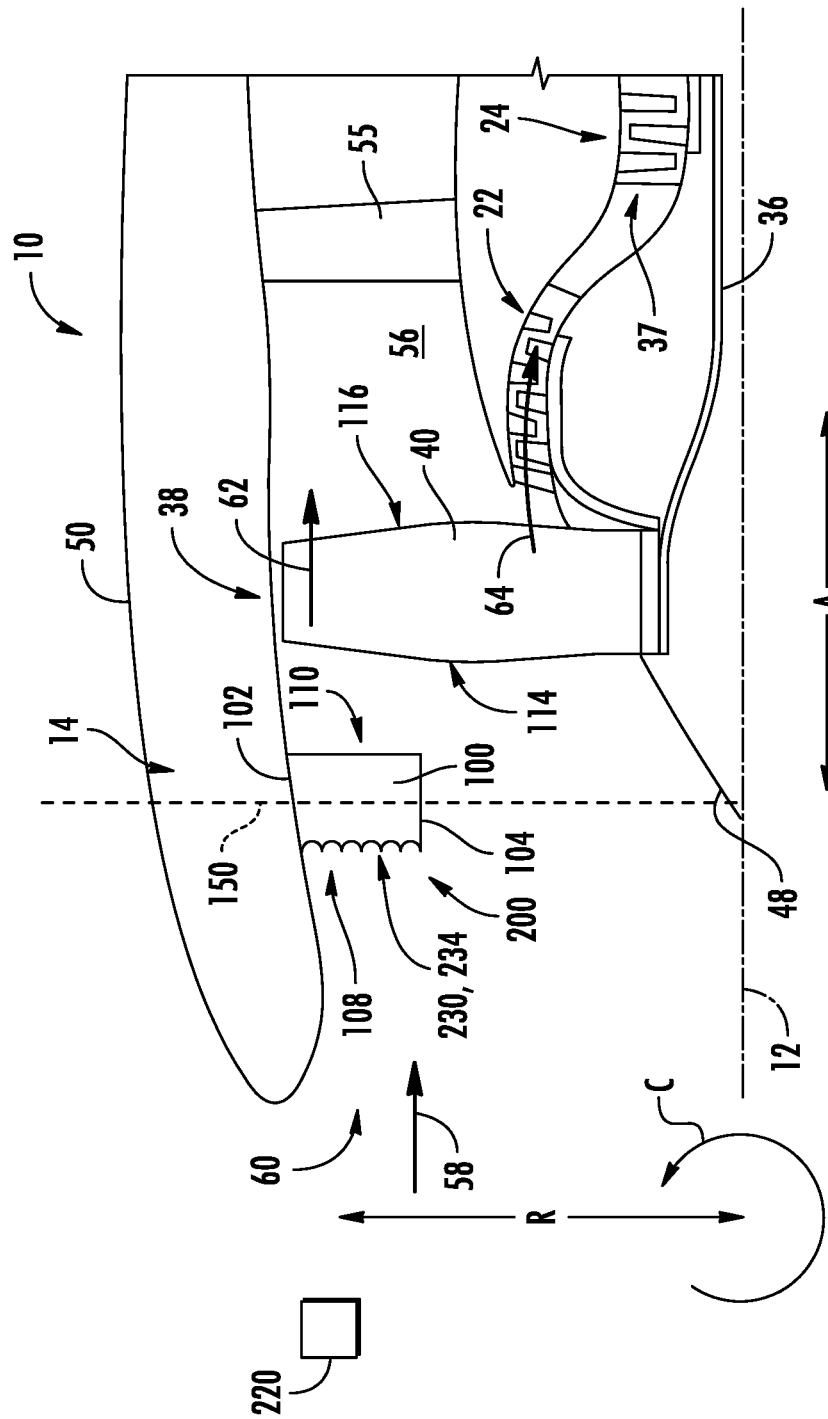
FIG. 10 is a schematic cross-sectional view of an exemplary gas turbine engine according to another exemplary embodiment of the present subject matter.

Referring to FIG. 10, in another exemplary embodiment, the means for directing incoming objects towards an outer portion of the turbofan engine 200 includes a leading edge 108 of the inlet pre-swirl feature, e.g., configured as a plurality of part span inlet guide vanes 100, that includes scalloped serrations 234.

It is also contemplated that any of the serrated portions 230 of the leading edge 108 of the inlet pre-swirl feature, e.g., configured as a plurality of part span inlet guide vanes 100, may also be acoustically tuned.

In other exemplary embodiments, the means for directing incoming objects towards an outer portion of the turbofan engine 200 includes an inlet pre-swirl feature, e.g., configured as a plurality of part span inlet guide vanes 100, having a leading edge formed of a metallic material. For example, the inlet pre-swirl feature, e.g., configured as a plurality of part span inlet guide vanes 100, can be made of many different materials, including polymer composites made of carbon fiber & resin, or fabricated from metal, including aluminum or stainless steel alloys. A composite or aluminum pre-swirl feature may incorporate a metallic leading edge made of titanium or stainless steel specifically to provide stiffness and address the issue of bird ingestion. Incorporating additional stiffness into the pre-swirl feature design via internal trusses or other structures should be well known to one that is skilled in the art, and can be accomplished by many different structural methods, depending on the chosen material and blade shape.

Further aspects of the disclosure are provided by the subject matter of the following clauses:

A turbofan engine comprising: a fan comprising a plurality of fan blades; a turbomachine operably coupled to the fan for driving the fan, the turbomachine comprising a compressor section, a combustion section, and a turbine section in serial flow order and together defining a core air flowpath; a nacelle surrounding and at least partially enclosing the fan; an inlet pre-swirl feature located upstream of the plurality of fan blades, the inlet pre-swirl feature attached to or integrated into the nacelle; and a means for directing incoming objects towards an outer portion of the turbofan engine in communication with the inlet pre-swirl feature.

The turbofan engine of any preceding clause, wherein the means for directing incoming objects towards the outer portion of the turbofan engine comprises a shroud in communication with a portion of the inlet pre-swirl feature.

The turbofan engine of any preceding clause, wherein the shroud is configured to separate an engine inlet airflow into an inner airflow portion and an outer airflow portion relative to a radial direction.

The turbofan engine of any preceding clause, wherein the inlet pre-swirl feature includes an outer end and an inner end relative to the radial direction, and wherein the shroud is located at the inner end of the inlet pre-swirl feature.

The turbofan engine of any preceding clause, wherein the inlet pre-swirl feature includes an outer end and an inner end relative to the radial direction, and wherein the shroud is located at a portion of the inlet pre-swirl feature that is closer to the inner end than the outer end.

The turbofan engine of any preceding clause, wherein the means for directing incoming objects towards the outer portion of the turbofan engine comprises a leading edge of the inlet pre-swirl feature having a forward sweep.

The turbofan engine of any preceding clause, wherein the forward sweep of the leading edge defines an angle between 3 degrees and 65 degrees.

The turbofan engine of any preceding clause, wherein the forward sweep of the leading edge defines an angle between 3 degrees and 45 degrees.

The turbofan engine of any preceding clause, wherein the forward sweep of the leading edge defines an angle between 3 degrees and 30 degrees.

The turbofan engine of any preceding clause, wherein the means for directing incoming objects towards the outer portion of the turbofan engine comprises a leading edge of the inlet pre-swirl feature that is serrated.

The turbofan engine of any preceding clause, wherein the leading edge of the inlet pre-swirl feature includes scalloped serrations.

The turbofan engine of any preceding clause, wherein the leading edge of the inlet pre-swirl feature includes saw-toothed serrations.

The turbofan engine of any preceding clause, wherein the leading edge of the inlet pre-swirl feature includes acoustically tuned serrations.

The turbofan engine of any preceding clause, wherein the means for directing incoming objects towards the outer portion of the turbofan engine comprises the inlet pre-swirl feature having a leading edge formed of a metallic material.

A turbofan engine comprising: a fan comprising a plurality of fan blades; a turbomachine operably coupled to the fan for driving the fan, the turbomachine comprising a compressor section, a combustion section, and a turbine section in serial flow order and together defining a core air flowpath; a nacelle surrounding and at least partially enclosing the fan; an inlet pre-swirl feature located upstream of the plurality of fan blades, the inlet pre-swirl feature attached to or integrated into the nacelle; and a shroud in communication with a portion of the inlet pre-swirl feature and configured to separate an engine inlet airflow into an inner airflow portion and an outer airflow portion relative to a radial direction.

The turbofan engine of any preceding clause, wherein the inlet pre-swirl feature includes an outer end and an inner end relative to the radial direction, and wherein the shroud is located at the inner end of the inlet pre-swirl feature.

The turbofan engine of any preceding clause, wherein the inlet pre-swirl feature includes an outer end and an inner end relative to the radial direction, and wherein the shroud is located at a portion of the inlet pre-swirl feature that is closer to the inner end than the outer end.

The turbofan engine of any preceding clause, wherein the shroud is further configured to direct incoming objects towards an outer portion of the turbofan engine.

The turbofan engine of any preceding clause, wherein the inlet pre-swirl feature is one of a plurality of inlet pre-swirl features, wherein the shroud extends along a circumferential direction between the plurality of inlet pre-swirl features.

The turbofan engine of any preceding clause, wherein the shroud extends substantially 360 degrees in the circumferential direction.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A turbofan engine comprising:
   a fan comprising a plurality of fan blades;
   a turbomachine operably coupled to the fan for driving the fan, the turbomachine comprising a compressor section, a combustion section, and a turbine section in serial flow order and together defining a core air flowpath;
   a nacelle surrounding and at least partially enclosing the fan;
   an inlet pre-swirl feature located upstream of the plurality of fan blades, the inlet pre-swirl feature attached to or integrated into the nacelle; and
   a means for directing incoming objects towards an outer portion of the turbofan engine in communication with the inlet pre-swirl feature, wherein the means for directing incoming objects towards the outer portion of the turbofan engine comprises a leading edge of the inlet pre-swirl feature that is serrated.

2. The turbofan engine of claim 1, wherein the leading edge of the inlet pre-swirl feature includes scalloped serrations.

3. The turbofan engine of claim 1, wherein the leading edge of the inlet pre-swirl feature includes saw-toothed serrations.

4. The turbofan engine of claim 1, wherein the leading edge of the inlet pre-swirl feature includes acoustically tuned serrations.

5. The turbofan engine of claim 1, wherein the leading edge of the inlet pre-swirl feature includes serrations that are configured to slice the incoming objects.

6. The turbofan engine of claim 1, wherein the leading edge of the inlet pre-swirl feature includes serrations that are configured to slice the incoming objects and direct the incoming objects away from the core air flowpath.

7. The turbofan engine of claim 1, wherein the means for directing incoming objects towards the outer portion of the turbofan engine comprises the inlet pre-swirl feature having the leading edge formed of a metallic material.

8. The turbofan engine of claim 1, wherein the nacelle defines a bypass passage with the turbomachine.

9. The turbofan engine of claim 8, wherein the inlet pre-swirl feature comprises a part span inlet guide vane extending from the nacelle at a location forward of the plurality of fan blades of the fan along an axial direction and aft of an inlet of the nacelle.

10. The turbofan engine of claim 9, wherein the part span inlet guide vane is configured to pre-swirl an airflow provided through the inlet of the nacelle and upstream of the plurality of fan blades of the fan.

11. A nacelle assembly for a turbofan engine, the turbofan engine comprising a fan including a plurality of fan blades, the nacelle assembly comprising:
a nacelle surrounding and at least partially enclosing the fan;
an inlet pre-swirl feature located upstream of the plurality of fan blades, the inlet pre-swirl feature attached to or integrated into the nacelle; and
a means for directing incoming objects towards an outer portion of the turbofan engine in communication with the inlet pre-swirl feature, wherein the means for directing incoming objects towards the outer portion of the turbofan engine comprises a leading edge of the inlet pre-swirl feature that is serrated.

12. The nacelle assembly of claim 11, wherein the leading edge of the inlet pre-swirl feature includes scalloped serrations.

13. The nacelle assembly of claim 11, wherein the leading edge of the inlet pre-swirl feature includes saw-toothed serrations.

14. The nacelle assembly of claim 11, wherein the leading edge of the inlet pre-swirl feature includes acoustically tuned serrations.

15. The nacelle assembly of claim 11, wherein the leading edge of the inlet pre-swirl feature includes serrations that are configured to slice the incoming objects.

16. The nacelle assembly of claim 11, wherein the leading edge of the inlet pre-swirl feature includes serrations that are configured to slice the incoming objects and direct the incoming objects away from a core air flowpath defined by a turbomachine of the turbofan engine.

17. The nacelle assembly of claim 11, wherein the means for directing incoming objects towards the outer portion of the turbofan engine comprises the inlet pre-swirl feature having the leading edge formed of a metallic material.

18. The nacelle assembly of claim 11, wherein the nacelle defines a bypass passage with a turbomachine of the turbofan engine.

19. The nacelle assembly of claim 18, wherein the inlet pre-swirl feature comprises a part span inlet guide vane extending from the nacelle at a location forward of the plurality of fan blades of the fan along an axial direction and aft of an inlet of the nacelle.

20. The nacelle assembly of claim 19, wherein the part span inlet guide vane is configured to pre-swirl an airflow provided through the inlet of the nacelle and upstream of the plurality of fan blades of the fan.

21. The nacelle assembly of claim 11, wherein the means for directing incoming objects towards the outer portion of the turbofan engine comprises the leading edge of the inlet pre-swirl feature having a forward sweep.

22. The nacelle assembly of claim 21, wherein the forward sweep of the leading edge defines an angle between 3 degrees and 65 degrees.

23. The nacelle assembly of claim 21, wherein the forward sweep of the leading edge defines an angle between 3 degrees and 45 degrees.

24. The nacelle assembly of claim 21, wherein the forward sweep of the leading edge defines an angle between 3 degrees and 30 degrees.

* * * * *